United States Patent
Chen

(10) Patent No.: US 10,474,773 B2
(45) Date of Patent: Nov. 12, 2019

(54) METHODS OF IMPROVING REINFORCED CONCRETE STRUCTURES VIA NUMERICAL SIMULATIONS

(71) Applicant: Livermore Software Technology Corporation, Livermore, CA (US)

(72) Inventor: Hao Chen, Pleasanton, CA (US)

(73) Assignee: Livermore Software Technology, Livermore, CA (US)

( * ) Notice: Subject to any disclaimer, the term of this patent is extended or adjusted under 35 U.S.C. 154(b) by 0 days.

(21) Appl. No.: 16/132,726

(22) Filed: Sep. 17, 2018

(65) Prior Publication Data

US 2019/0012416 A1    Jan. 10, 2019

Related U.S. Application Data

(63) Continuation-in-part of application No. 14/693,000, filed on Apr. 22, 2015, now abandoned.

(51) Int. Cl.
G06F 17/50        (2006.01)

(52) U.S. Cl.
CPC ...... *G06F 17/5018* (2013.01); *G06F 17/5004* (2013.01); *G06F 2217/16* (2013.01)

(58) Field of Classification Search
CPC ... G06F 17/5018; G06F 17/5004; G06F 17/50
See application file for complete search history.

(56) References Cited

U.S. PATENT DOCUMENTS

| | | | |
|---|---|---|---|
| 7,392,163 B1* | 6/2008 | Bindeman | G06F 17/5018 345/420 |
| 2011/0191068 A1* | 8/2011 | Wainscott | G06F 17/5018 703/1 |

(Continued)

OTHER PUBLICATIONS

Gerd-Jan Schreppers and TNO DIANA BV ("Embedded Reinforcements," DIANA White Papers, DIANA FEA Jan. 2011) (Year: 2011).*

(Continued)

*Primary Examiner* — Omar F Fernandez Rivas
*Assistant Examiner* — Joshua E. Jensen
(74) *Attorney, Agent, or Firm* — Roger H Chu

(57) ABSTRACT

Characteristics of a reinforced concrete structure are received. FEA model is created in a computer system accordingly. FEA model contains solid elements defined solid nodes and beam elements defined by master beam nodes. Beam elements representing reinforcing steel bars are embedded inside solid elements representing concrete. Each beam element straddles one or more solid elements. Slave beam nodes along the at least one beam element are created such that each of the solid elements houses at least one slave beam node. Numerically-simulated structural behaviors of the reinforced concrete structure are obtained at each solution cycle of the time-marching simulation. Proper coupling of solid elements and at least one beam element are ensured. Exchanges of masses and momentums between a slave beam node and corresponding solid element nodes is conducted with both consistent and non-consistent portions. Reinforced concrete structure is adjusted to alleviate weakness indicated in the numerically-simulated structural behaviors.

3 Claims, 10 Drawing Sheets

○ Solid Element Node
□ Master Beam Node 422    △ Slave Beam Node 424

(56) References Cited

U.S. PATENT DOCUMENTS

2013/0103367 A1* 4/2013 Erhart .................. G06F 17/5018
                                                         703/2
2015/0161295 A1* 6/2015 Arita ....................... G06F 17/50
                                                         703/1

OTHER PUBLICATIONS

Excerpts from DIANA User's Manual version 9.4.4, https://dianafea.com/manuals/d944/Diana.html, retreived on May 24, 2018, 2011 (Year: 2011).*

Spiliopoulos, K. V., and G. Ch Lykidis. "An efficient three-dimensional solid finite element dynamic analysis of reinforced concrete structures." Earthquake engineering & structural dynamics 35.2 (2006): 137-157. (Year: 2006).*

Schwer, Len. "Modeling rebar: The forgotten sister in reinforced concrete modeling." 13th International LS-DYNA® Users Conference. 2014. (Year: 2014).*

Sadek, Machhour, and Isam Shahrour. "A three dimensional embedded beam element for reinforced geomaterials." International journal for numerical and analytical methods in geomechanics 28.9 (2004): 931-946. (Year: 2004).*

USPTO Office Action For U.S. Appl. No. 14/693,000 (Parent application to the instant application) dated Aug. 16, 2017.

Gard-Jan Schreppers and TNO DIANA BV ("Embedded Reinforcements",DIANA White Paper, DIANA FEA Jan. 2011).

USPTO Office Action for U.S. Appl. No. 14/693,000 (Parent application to the instant application) dated Jun. 15, 2018.

* cited by examiner

○ Solid Element Node 312          ☐ Master Beam Node 322

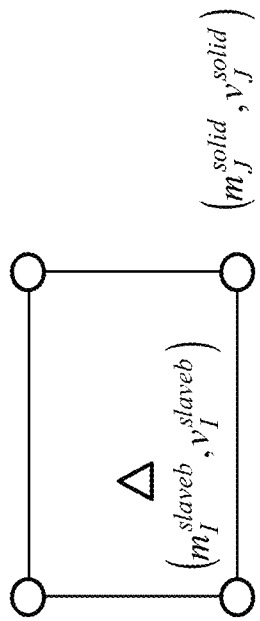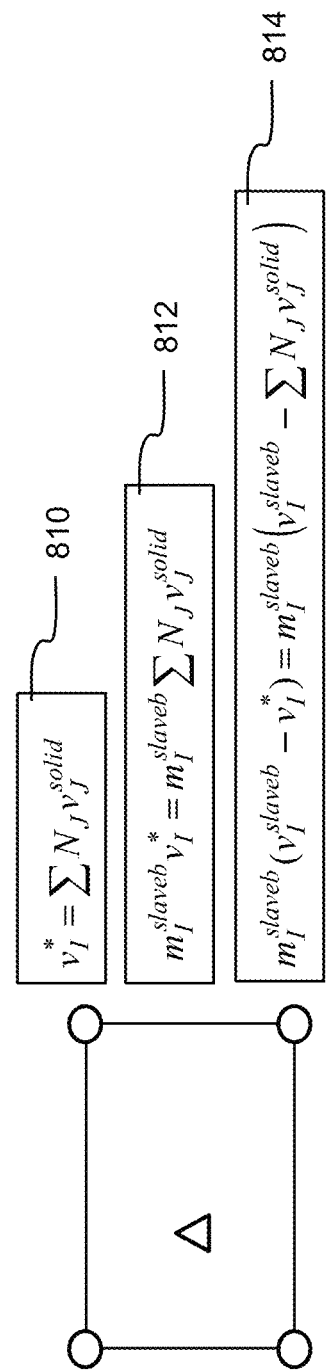

METHODS OF IMPROVING REINFORCED CONCRETE STRUCTURES VIA NUMERICAL SIMULATIONS

CROSS-REFERENCE TO RELATED APPLICATIONS

This application is continuation-in-part (CIP) of a pending U.S. patent application for the same title, Ser. No. 14/693,000, filed on Apr. 22, 2015.

FIELD

This patent disclosure generally relates to computer-aided engineering analysis, more particularly to methods of improving reinforced concrete structures via numerical simulations using finite element analysis model.

BACKGROUND

Many modern engineering analyses are performed with the aid of a computer system. One of such computer aided engineering (CAE) analyses is referred to as finite element analysis (FEA) or finite element method (FEM). FEA is a computer implemented method widely used in industry to model and solve engineering problems relating to complex systems such as three-dimensional, non-linear structural design, and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells, and beams of various sizes, which are called elements. The vertices of the elements are referred to as nodes. The model is comprised of a finite number of elements, which are assigned a material identifier to associate with its material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Reinforced concrete has been used for constructing many different types of structures (e.g., buildings, dams, bridges, highways, etc.). Engineers have been relied on numerically simulated structural behaviors of reinforced concrete in FEA to make decisions improve the structural design. Prior art approaches to represent reinforced concrete structure in FEA include some ad hoc techniques, which may work properly in certain circumstances but not all incidences. It would, therefore, be desirable to have more thorough methods and systems for numerically simulating structural behaviors of reinforced concrete in finite element analysis.

BRIEF SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods of improving reinforce concrete structures via numerically simulating structural behaviors using finite element analysis (FEA) are disclosed. According to one aspect of the disclosure, characteristics of a reinforced concrete structure are received. Accordingly, FEA model representing the reinforced concrete structure that reflects the received characteristics is created in a computer system having a FEA application module installed thereon. The FEA model contains a number of solid elements defined by a number of solid element nodes and a number of beam elements defined by a number of master beam element nodes. Beam elements representing reinforcing steel bars are embedded inside solid elements representing concrete. Each beam element straddles one or more solid elements. Slave beam nodes along the at least one beam element are created such that each of the solid elements houses at least one slave beam node. Numerically simulated structural behaviors of the reinforced concrete structure are obtained by conducting a time-marching simulation using the FEA model.

At each of the many solution cycles of the time-marching simulation, proper coupling of the solid elements and the at least one beam element is ensured with the following operations: (a) slave beam nodal masses and velocities at each slave beam node are obtained from the corresponding master beam nodes, (b) solid element nodal masses and momentums at each solid element node are updated by accumulating respective contributions from relevant ones of the slave beam nodes with corresponding solid element shape functions, (c) the updated slave beam nodal velocities at each slave beam node are then calculated using said updated solid element nodal masses and momentums with the corresponding solid element shape functions, (d) master beam nodal masses and momentums at each master beam node are updated by accumulating respective contributions from the calculated slave nodal masses and velocities with corresponding beam element shape functions; and (e) the updated master beam nodal velocities at said each master beam node are calculated by dividing the updated master beam nodal momentums by the updated master beam nodal masses, respectively.

According to another aspect, the characteristics of the reinforced concrete structure is physically adjusted to alleviate weakness/problem indicated in the numerically simulated structural behaviors, so that the reinforced concrete structure is improved. The characteristics may include, but are not limited to, size and number of reinforced steel bars and type and size of the concrete, relative orientations between the reinforced steel bars and the concrete.

According to another yet aspect, the exchanges of nodal masses and momentums between each slave beam node and corresponding solid element nodes are conducted with contributions from consistent and non-consistent nodal momentums at each slave beam node.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

FIGS. 8A-8D are diagrams illustrating a sequence of example exchanges of nodal masses and momentums between each slave beam node and corresponding solid element nodes with contributions from consistent and non-consistent nodal momentums at each slave beam node in accordance with one embodiment of the invention.

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1A-9. However, those skilled in the art will readily appreciate that the detailed description given herein with respect to these figures is for explanatory purposes as the invention extends beyond these limited embodiments.

Figure 1A:
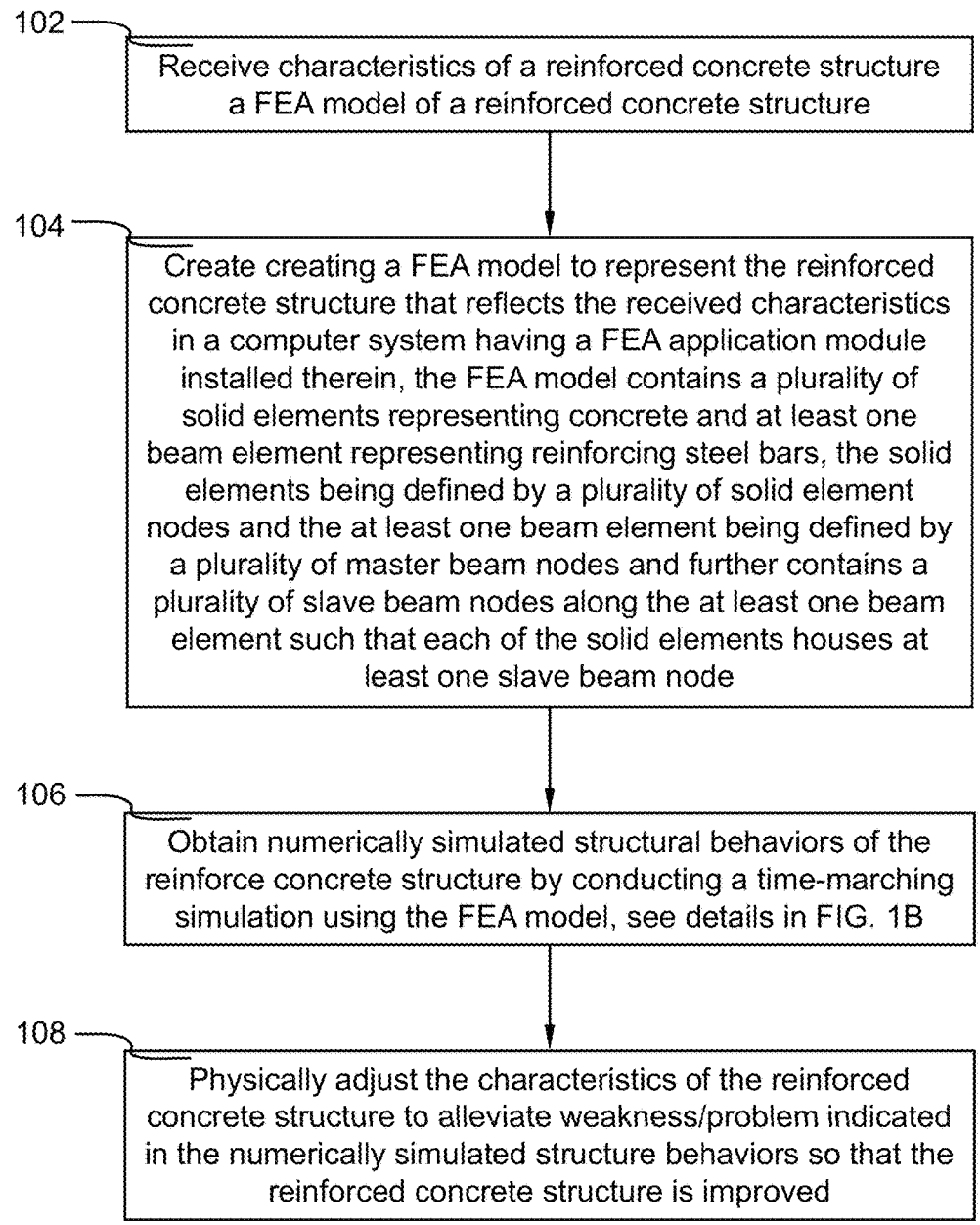
FIGS. 1A-1C collectively show a flowchart illustrating an example process of numerically simulating structural behaviors of reinforced concrete in finite element analysis according to one embodiment of the invention.
Figure 1B:
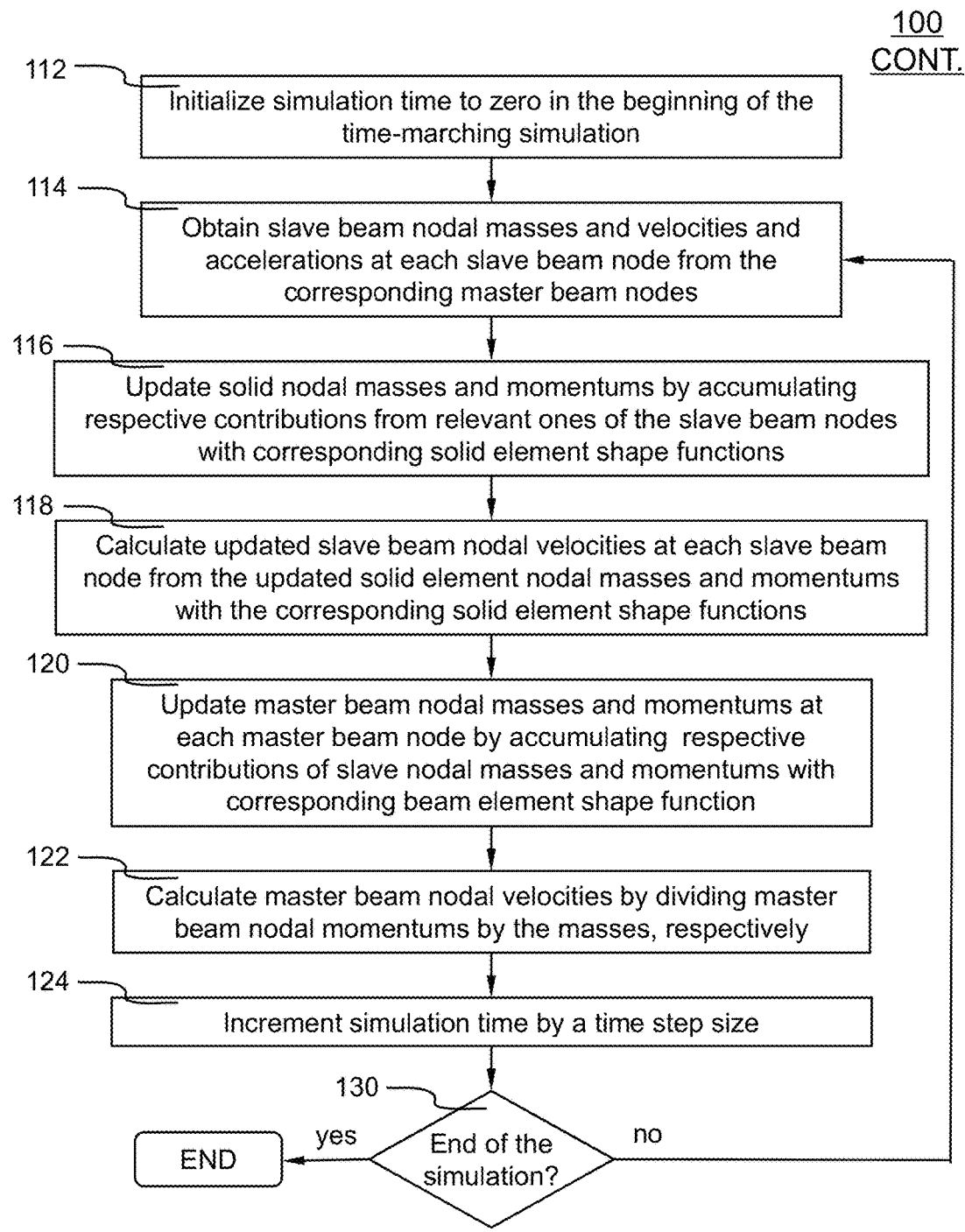

Referring first to FIGS. 1A-1B, it is shown a flowchart illustrating an example process 100 of improving reinforced concrete structures via numerically simulating structural behaviors using finite element analysis (FEA). Portion of the process 100 may be implemented in software. Process 100 is preferably understood with other figures.

Process 100 starts by receiving characteristics of a reinforced concrete structure at action 102. Then, at action 104, a FEA model representing the reinforced concrete structure (e.g., a reinforced concrete structure 200 shown in FIG. 2) that reflects the received characteristics is created in a computer system (e.g., computer system 900 of FIG. 9) having a FEA application module installed thereon. The FEA model (e.g., FEA model 300 in FIG. 3) includes a number of solid elements 310a-310d defined by a number of solid element nodes 312 and at least one beam element 320 defined by a plurality of master beam nodes 322. The at least one beam element representing reinforcing steel bars is embedded inside the solid elements representing concrete.

The example FEA model 300 containing four solid elements 310a-310d and one beam element 320 can be one component of the reinforced concrete structure 200.

Figure 4:
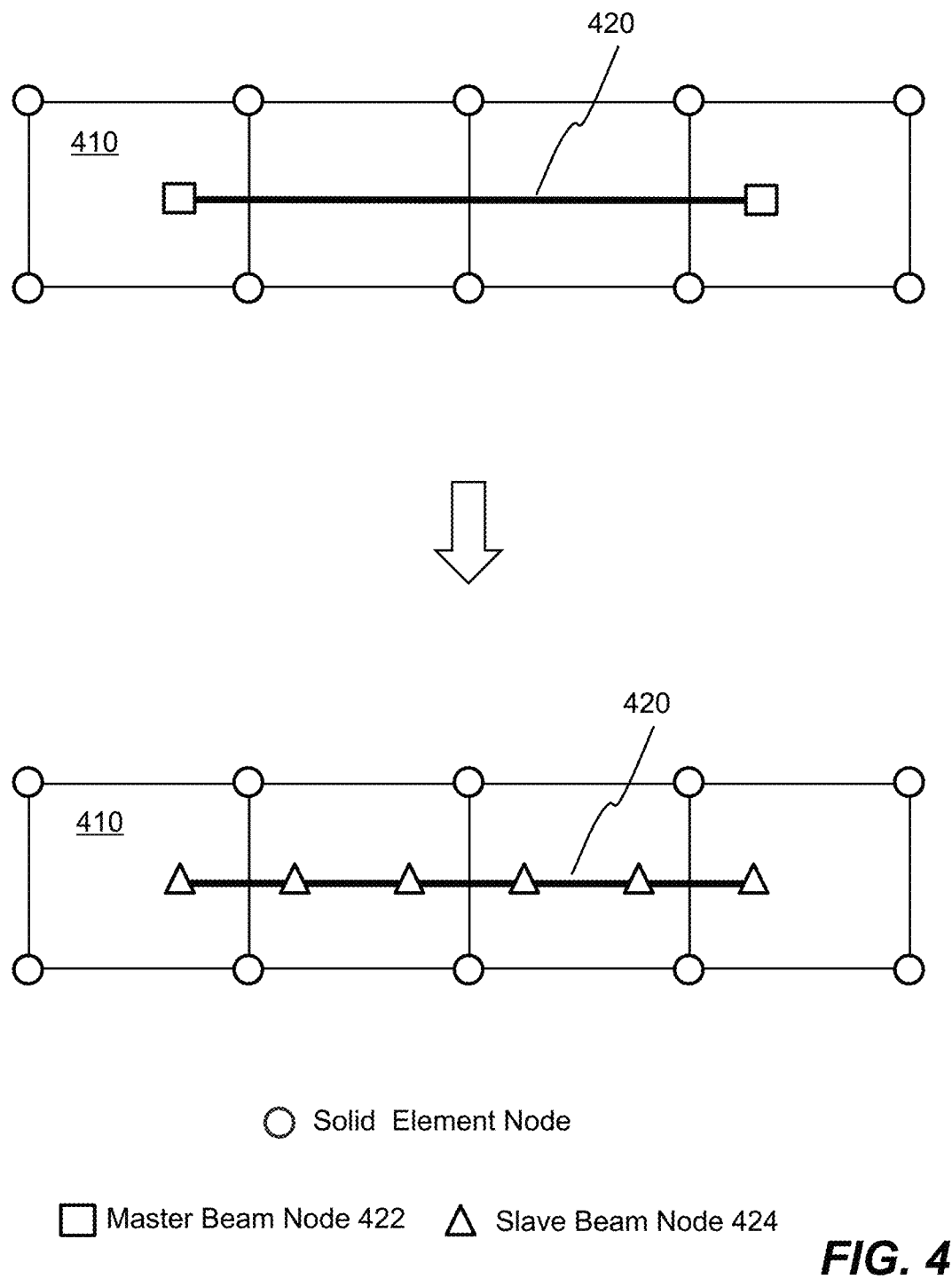
FIG. 4 is a two-dimensional diagram showing creation of slave beam nodes along a beam element in an example FEA model, according to an embodiment of the invention.

A plurality of slave beam nodes are created along the at least one beam element such that each of the solid elements houses at least one slave beam node. FIG. 4 is a two-dimensional diagram showing an example slave node creation scheme. Using two-dimensional view in lieu of a three-dimensional view is for illustration simplicity and visual clarity. Each beam element 420 embedded inside solid elements 410 is defined by two master beam nodes 422. Slave beam nodes 424 are created along the beam element 420. In another embodiment, the example shown in FIG. 4 can be changed to one slave node 424 per solid element instead of two.

Next, at action 106, numerically simulated structural behaviors of the reinforced concrete structure are obtained by conducting a time-marching simulation using the FEA model with the FEA application module. The time-marching simulation contains many solution cycles or time steps covering the entire simulation time span or duration. At each solution cycle, proper coupling of the solid elements and the at least one beam element must be ensured to obtain numerically simulated structural behaviors. Details of conducting such a coupling is shown in FIG. 1B.

At action 112, the simulation time is initialized to zero at the beginning of the time-marching simulation. Next, at action 114, slave beam nodal masses and velocities at each slave beam node are obtained from corresponding master beam nodes (shown as a schematic diagram in FIG. 5A). According to one embodiment, each slave beam's nodal mass is obtained by evenly distributing the total mass of the original beam defined by two master beam nodes. Slave beam nodal velocities are obtained through interpolation of the velocities of the master beam nodes.

Figure 5A:
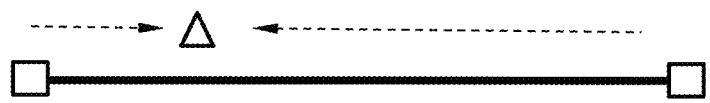
FIGS. 5A-5D is two-dimensional schematic diagrams showing an example coupling technique in accordance with one embodiment of the invention.
Figure 5B:
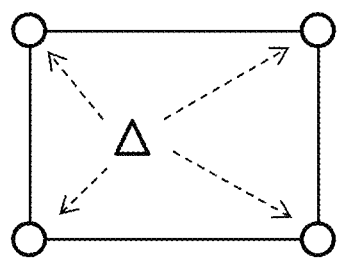
Figure 5C:
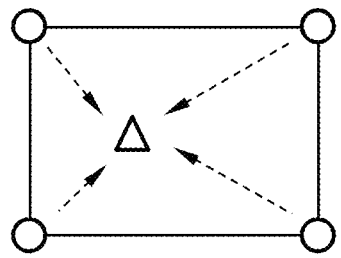
Figure 5D:
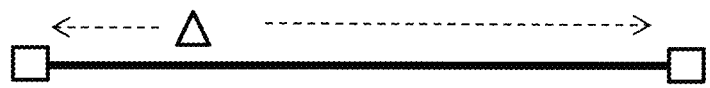
Figure 6:
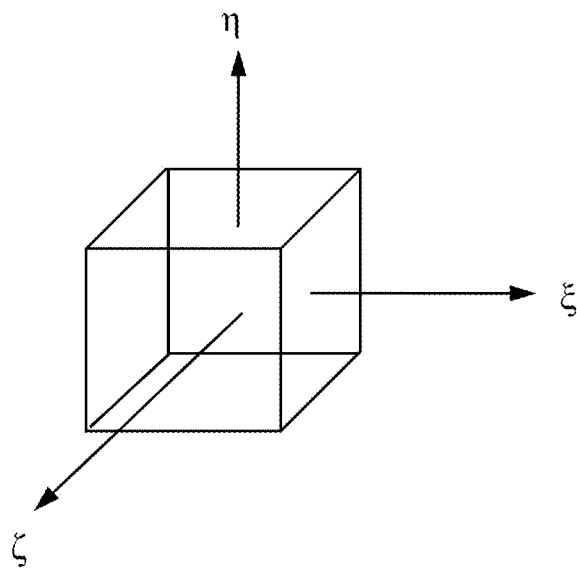
FIG. 6 is a diagram showing a local element coordinate system for an example solid element in accordance to one embodiment of the invention.
Figure 7:
FIG. 7 is a diagram showing a local element coordinate system for an example beam element in accordance to one embodiment of the invention.

At action 116, solid element nodal masses and momentums at each solid element node are updated by accumulating respective contributions from relevant ones of the slave beam nodes (e.g., the ones reside within each solid element) according to the corresponding solid element shape functions (shown as a schematic diagram in FIG. 5B). At action 118, slave beam nodal velocities at each slave beam node are calculated from the updated solid element nodal masses and momentums according to the corresponding solid element shape functions (shown as schematic diagram in FIG. 5C). Next, at action 120, master beam nodal masses and momentums at each master beam node are updated by accumulating respective contributions of slave beam nodal masses and momentums with corresponding beam element shape functions (shown as schematic diagram in FIG. 5D). At action 122, master beam nodal velocities at each master node are calculated by dividing the master nodal momentums to the master nodal masses, respectively. FIG. 6 is a diagram showing a local element coordinate system of an example solid element. FIG. 7 is a diagram showing a local element coordinate system of an example beam element.

The simulation time is then incremented by a time step size at action 124. Next, at decision 130, it is determined whether the time-marching simulation has ended with well known techniques. If not, process 100 follows the "no" link to repeat actions 114-124 for next solution cycle until decision 130 becomes true. Then process 100 ends following the "yes" link.

According to one embodiment, the coupling technique is implemented with the following procedure.
1) Generate slave beam nodes from the master beam(s),
2) Couple slave beam nodes to solid element nodes.
2.1) Loop through all slave beam nodes
2.1.1) Gather each slave beam node's masses and velocities $(m_I^{slaveb}, v_I^{slaveb})$
2.1.2) Find out local solid element coordinates $(\xi, \eta, \zeta)$ of a corresponding solid element (e.g., see FIG. 6) at which each slave beam node is located.
2.1.3) Calculate corresponding solid element shape functions (for 8-node solid element)

$$N_1 = \tfrac{1}{8}(1-\xi)*(1-\eta)*(1-\zeta)$$

$$N_2 = \tfrac{1}{8}(1-\xi)*(1-\eta)*(1-\zeta)$$

$$N_3 = \tfrac{1}{8}(1-\xi)*(1-\eta)*(1-\zeta)$$

$$N_4 = \tfrac{1}{8}(1-\xi)*(1-\eta)*(1-\zeta)$$

$$N_5 = \tfrac{1}{8}(1-\xi)*(1-\eta)*(1-\zeta)$$

$$N_6 = \tfrac{1}{8}(1-\xi)*(1-\eta)*(1-\zeta)$$

$$N_7 = \tfrac{1}{8}(1-\xi)*(1-\eta)*(1-\zeta)$$

$$N_8 = \tfrac{1}{8}(1-\xi)*(1-\eta)*(1-\zeta)$$

2.1.4) Distribute slave beam nodal masses and momentums to solid element nodes $$M_J^{solid} = m_J^{solid} + N_J * m_I^{slaveb}$$

$$(mv)_J^{solid} = (mv)_J^{solid} + N_J * (mv)_I^{slaveb}$$

2.2) Loop through all solid element nodes to calculate new solid element nodal velocities $$V_J^{solid} = (mv)_J^{solid} / M_J^{solid}$$

2.3) Loop through all slave beam nodes to calculate new slave beam nodal velocities from the new solid element nodal velocities $$V_I^{slaveb} = \Sigma_J N_J * V_J^{solid} (J=1,8)$$

3) Couple slave beam nodes to master beam nodes
3.1) Loop through all slave beam nodes
3.1.1) Gather each slave nodal masses and velocities $(M_I^{slaveb}, V_I^{slaveb})$
3.1.2) Find out local beam element coordinate $(\xi)$ of a corresponding beam element (e.g., see FIG. 7) at which each slave beam node is located.
3.1.3) Calculate corresponding beam element shape functions (for 2-node beam element)

$$N_1 = \tfrac{1}{2}(1-\xi)$$

$$N_2 = \tfrac{1}{2}(1+\xi)$$

3.1.4) Distribute slave nodal masses and momentums to master beam nodes $$m_J^{masterb} = m_J^{masterb} + N_J * M_I^{slaveb}$$

$$(mv)_J^{masterb} = (mv)_J^{masterb} / m_J^{masterb}$$

3.2) Loop through all master beam nodes to calculate new master beam nodal velocities $$v_J^{masterb} = (mv)_J^{masterb} / m_J^{masterb}$$

Referring back to FIG. 1A, at action 108, the characteristics of the reinforced concrete structure is physically adjusted to alleviate weakness/problem indicated in the numerically simulated structural behaviors, so that the reinforced concrete structure is improved. The characteristics may include, but are not limited to, size and number of reinforced steel bars and type and size of the concrete, relative orientations between the reinforced steel bars and the concrete.

Figure 1C:
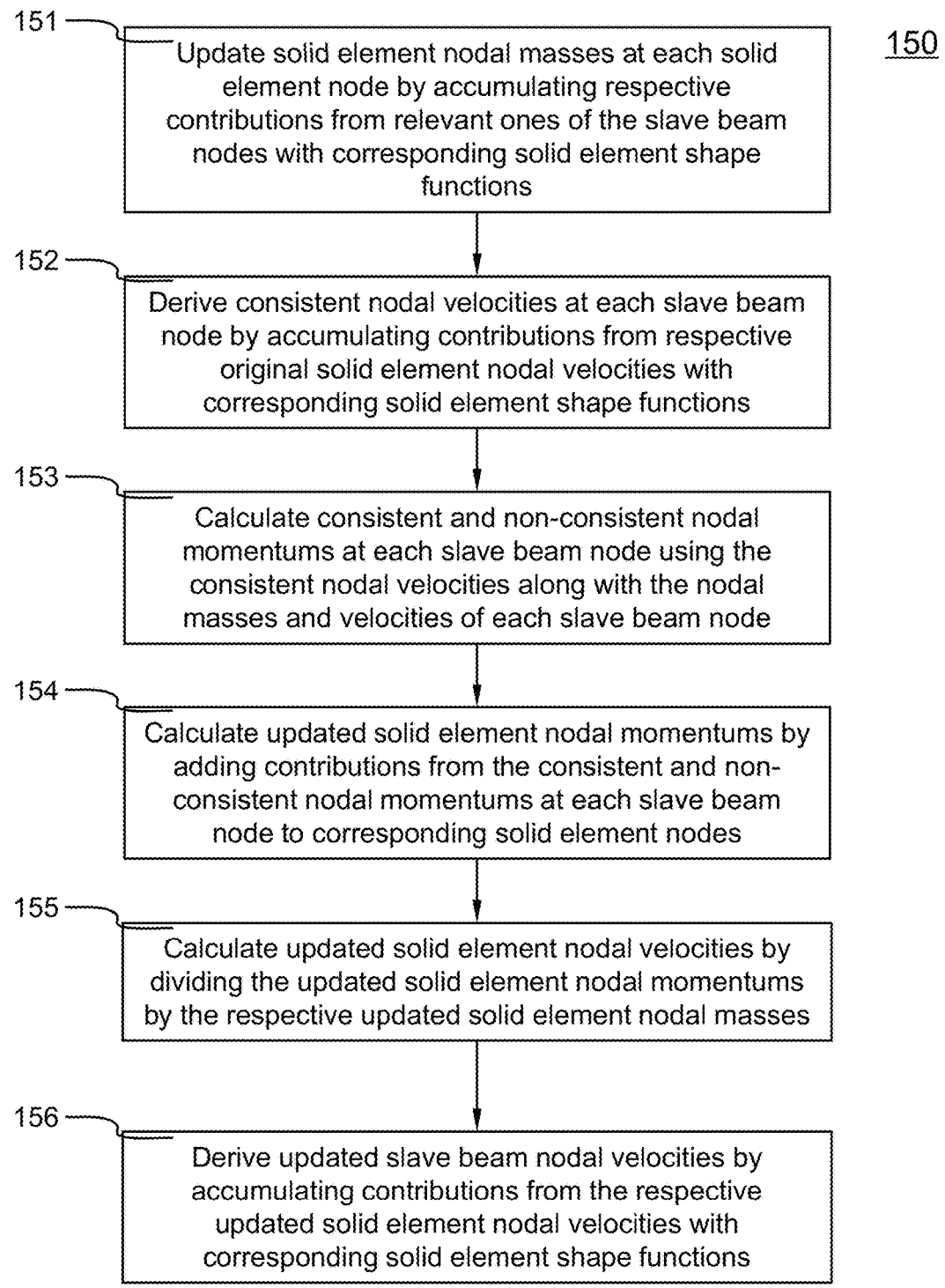
Figure 2:
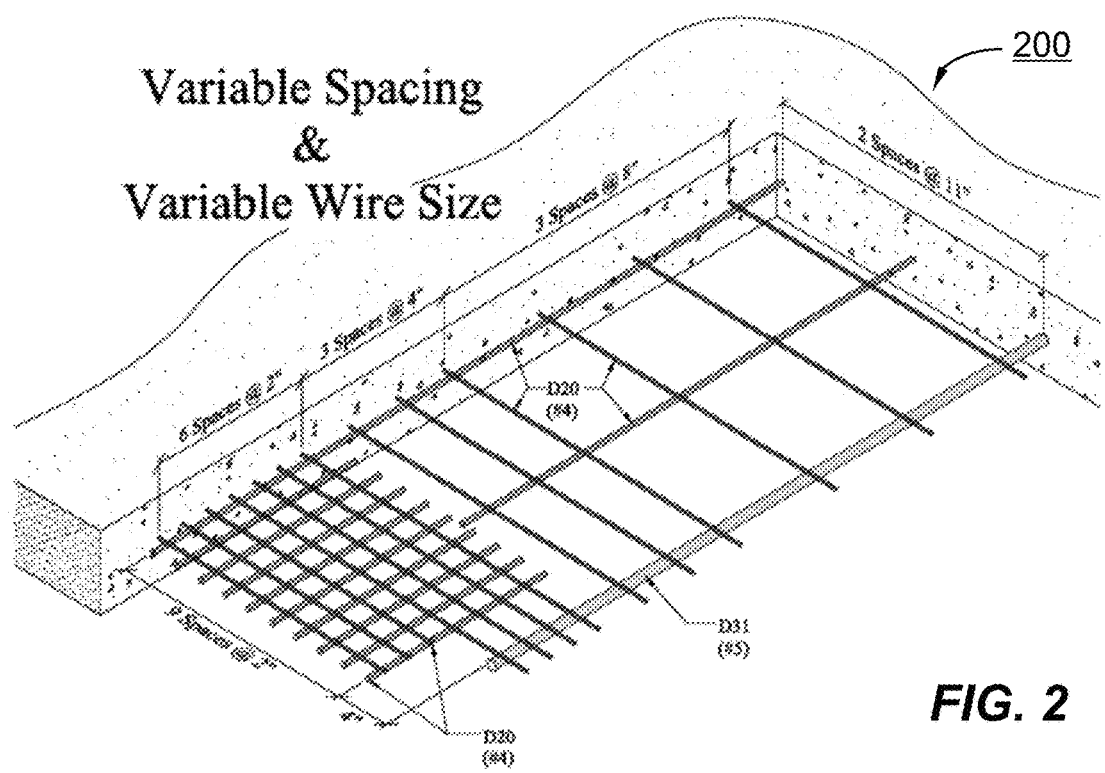
FIG. 2 is a perspective diagram showing an example reinforced concrete structure, whose structural behaviors can be numerically simulated by an embodiment of the invention.
Figure 3:
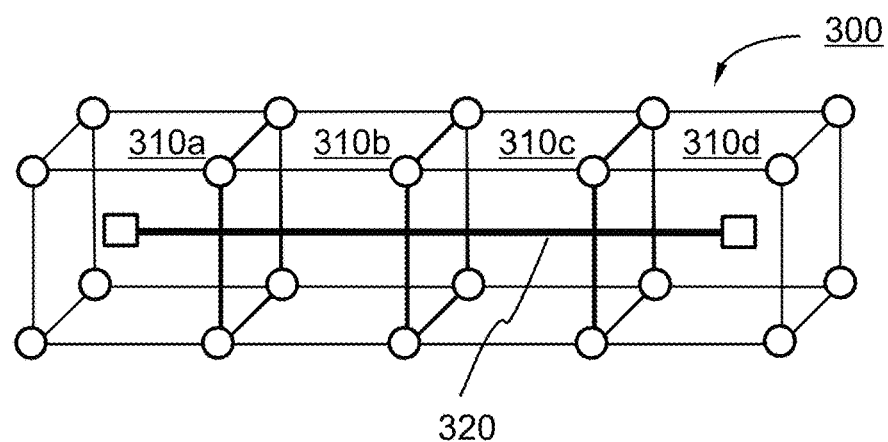
FIG. 3 is a diagram showing an example FEA model representing a reinforced concrete structure, according to an embodiment of the invention.

In an alternative embodiment, the exchanges of nodal masses and momentums between each slave beam node (shown as a triangle) and corresponding solid element nodes (shown as circles) are conducted with contributions from consistent and non-consistent nodal momentums at each slave beam node. In other words, the aforementioned equation for solid element nodal momentums listed under (2.1.4) is different. Respective details of actions 116 and 118 shown in FIG. 1C are an example of such exchanges illustrated in FIGS. 8A-8D.

The example exchanges start with each slave beam node (shown as a triangle) having an original nodal masses and velocities $(m_I^{slaveb}, v_I^{slaveb})$ and the corresponding solid element nodes (shown as circles) having nodal masses and velocities $(m_J^{solid}, v_J^{solid})$ shown in FIG. 8A. The original nodal masses and velocities at each slave node may be obtained by evenly distributing the total mass of the original beam defined by two master beam nodes.

At action 151, the updated solid element nodal masses $M_J^{solid}$ of the corresponding solid element are calculated by accumulating respective contributions from relevant ones of the slave beam nodes with corresponding solid element shape functions $N_J$. Equation 820 shown in FIG. 8C represents action 151, which is the same as the equation for solid element nodal masses listed under (2.1.4).

However, the updated solid element nodal momentums are calculated differently in the alternative embodiment as described in actions 152-154. At action 152, consistent nodal velocities $v_I^*$ at each slave beam node are derived by accumulating contributions from respective original nodal velocities $v_J^{solid}$ of the solid element with corresponding solid element shape functions $N_J$. The action 152 is shown in FIG. 8B as Equation 810.

Next, at action 153, consistent and non-consistent nodal momentums at each slave beam node are calculated using Equations 812 and 814 shown in FIG. 8B, respectively.

Figure 8C:
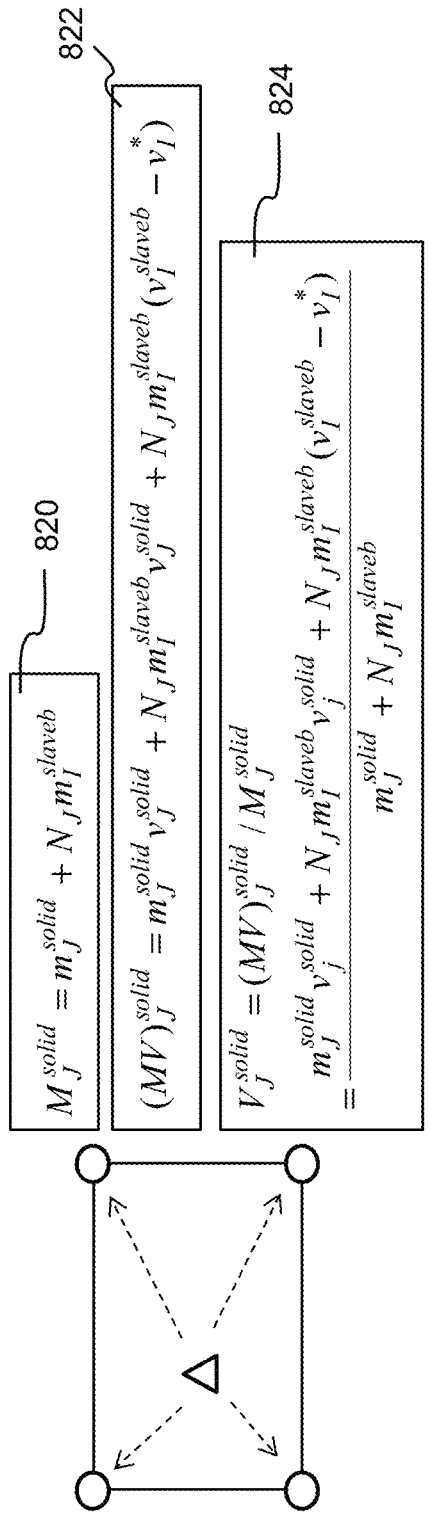

Then, at action 154, the updated solid element nodal momentums $(MV)_J^{solid}$ are calculated using contributions from the consistent and the consistent nodal momentums at each slave beam node in Equation 822 shown in FIG. 8C.

Next, at action 155, updated solid element nodal velocities $V_J^{solid}$ are calculated by dividing the updated solid element nodal momentums $(MV)_J^{solid}$ by the respective solid element nodal masses $M_J^{solid}$ in Equation 824 shown in FIG. 8C.

Figure 8D:
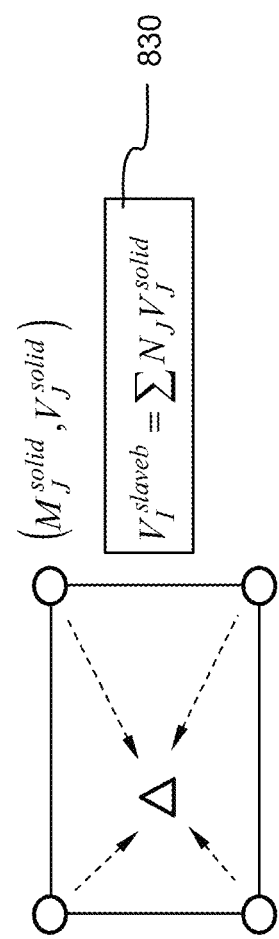

Finally, at action 156, the updated slave beam nodal velocities $V_I^{slaveb}$ are calculated using Equation 830 shown in FIG. 8D, which is accomplished by accumulating contributions from the respective updated solid element nodal velocities $V_J^{solid}$ with corresponding solid element shape functions $N_J$.

Figure 9:
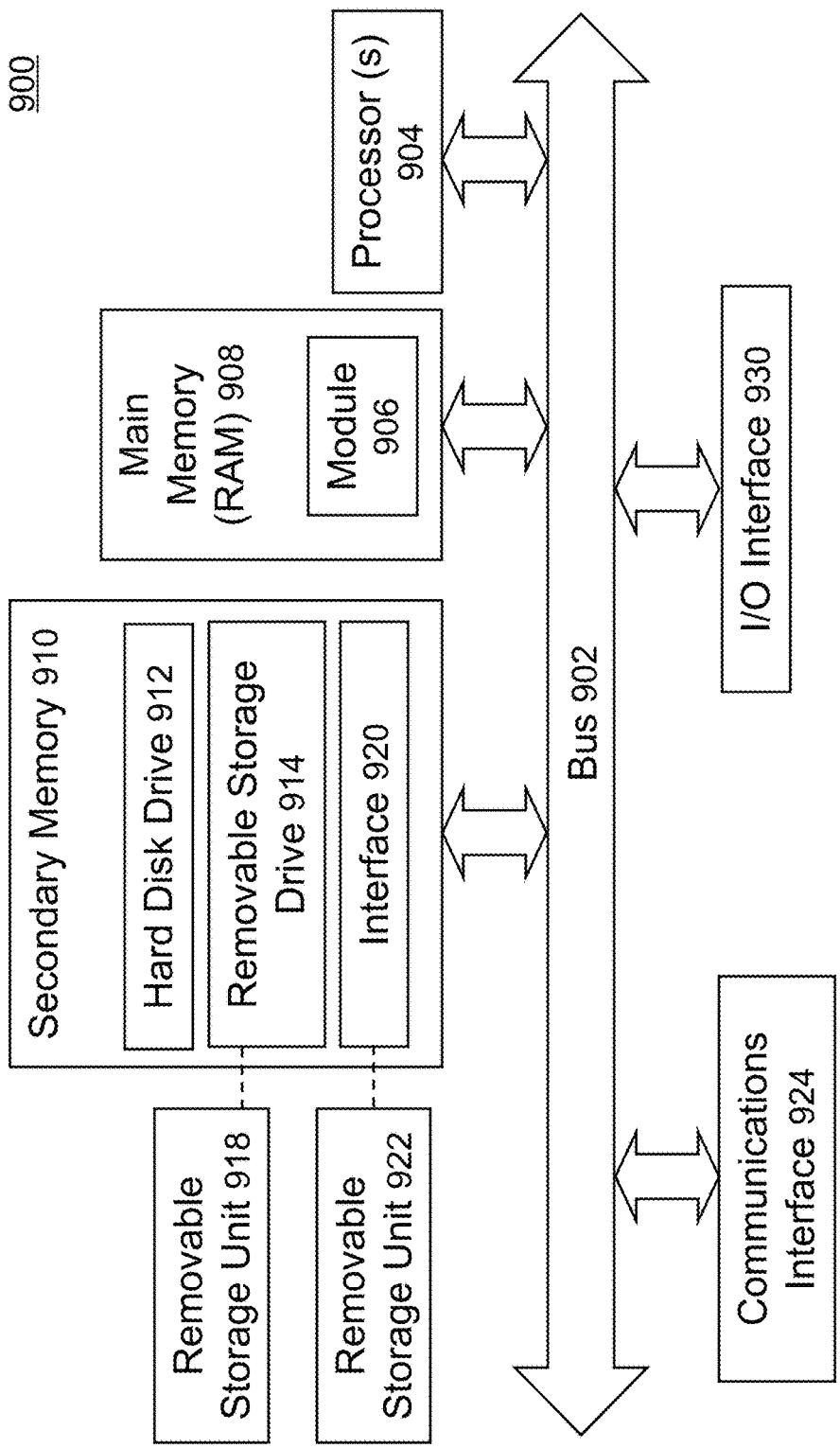
FIG. 9 is a function diagram showing salient components of a computing device, in which an embodiment of the invention may be implemented.

According to one aspect, the invention is directed towards one or more computer systems capable of carrying out the functionality described herein. An example of a computer system 900 is shown in FIG. 9. The computer system 900 includes one or more processors, such as processor 904. The processor 904 is connected to a computer system internal communication bus 902. Various software embodiments are described in terms of this exemplary computer system. After reading this description, it will become apparent to a person skilled in the relevant art(s) how to implement the invention using other computer systems and/or computer architectures.

Computer system 900 also includes a main memory 908, preferably random access memory (RAM), and may also include a secondary memory 910. The secondary memory 910 may include, for example, one or more hard disk drives 912 and/or one or more removable storage drives 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 922 and interfaces 920 which allow software and data to be transferred from the removable storage unit 922 to computer system 900. In general, Computer system 900 is controlled and coordinated by operating system (OS) software, which performs tasks such as process scheduling, memory management, networking and I/O services.

There may also be a communications interface 924 connecting to the bus 902. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. The computer 900 communicates with other computing devices over a data network based on a special set of rules (i.e., a protocol). One of the common protocols is TCP/IP (Transmission Control Protocol/Internet Protocol) commonly used in the Internet. In general, the communication interface 924 manages the assembling of a data file into smaller packets that are transmitted over the data network or reassembles received packets into the original data file. In addition, the communication interface 924 handles the address part of each packet so that it gets to the right destination or intercepts packets destined for the computer 900. In this document, the terms "computer program medium" and "computer usable medium" are used to generally refer to media such as removable storage drive 914, and/or a hard disk installed in hard disk drive 912. These computer program products are means for providing software to computer system 900. The invention is directed to such computer program products.

The computer system 900 may also include an input/output (I/O) interface 930, which provides the computer system 900 to access monitor, keyboard, mouse, printer, scanner, plotter, and alike.

Computer programs (also called computer control logic) are stored as application modules 906 in main memory 908 and/or secondary memory 910. Computer programs may also be received via communications interface 924. Such computer programs, when executed, enable the computer system 900 to perform the features of the invention as discussed herein. In particular, the computer programs, when executed, enable the processor 904 to perform features of the invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. The application module 906, when executed by the processor 904, causes the processor 904 to perform the functions of the invention as described herein.

The main memory 908 may be loaded with one or more application modules 906 (e.g., discrete element method) that can be executed by one or more processors 904 with or without a user input through the I/O interface 930 to achieve desired tasks. In operation, when at least one processor 904 executes one of the application modules 906, the results are computed and stored in the secondary memory 910 (i.e., hard disk drive 912). The result and/or status of the finite element analysis (e.g., crack propagation) is reported to the user via the I/O interface 930 either in a text or in a graphical representation to a monitor coupled to the computer.

Although the invention has been described with reference to specific embodiments thereof, these embodiments are merely illustrative, and not restrictive of, the invention. Various modifications or changes to the specifically disclosed exemplary embodiments will be suggested to persons skilled in the art. Whereas only few solid elements and one beam have been shown and described, the invention does not limit how many solid and/or beam elements in a FEA model to achieve the same. Additionally, whereas hexahedral elements have been shown and described as solid elements, other type of solid elements can be used to achieve the same, for example, tetrahedral elements. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of improving reinforced concrete structure via numerically simulating structural behaviors obtained using finite element analysis (FEA) comprising:

receiving characteristics of a reinforced concrete structure;

creating a FEA model to represent the reinforced concrete structure that reflects the received characteristics in a computer system having a FEA application module installed thereon, the FEA model containing a plurality of solid elements defined by a plurality of solid element nodes and at least one beam element defined by a plurality of master beam element nodes, wherein the at least one beam element representing reinforcing steel bars are embedded inside the solid elements representing concrete, and the FEA model further containing a plurality of slave beam nodes along the at least one beam element such that each of the solid elements houses at least one slave beam node;

obtaining, by the FEA application module, numerically simulated structural behaviors of the reinforced concrete structure by conducting a time-marching simulation using the FEA model, at each of a plurality of solution cycles of the time-marching simulation, proper coupling of the solid elements and the at least one beam element being ensured with following operations:

obtaining slave beam nodal masses and velocities at each slave beam node from the corresponding master beam nodes;

updating solid element nodal masses at each solid element node by accumulating respective contributions from relevant ones of the slave beam nodes with corresponding solid element shape functions;

calculating updated slave beam nodal velocities at each slave beam node using said updated solid element nodal masses and momentums with the corresponding solid element shape functions;

updating master beam nodal masses and momentums at each master beam node by accumulating respective contributions from the calculated slave nodal masses and velocities with corresponding beam element shape functions; and calculating the updated master beam nodal velocities at said each master beam node by dividing the updated master beam nodal momentums by the updated master beam nodal masses, respectively.

2. The method of claim 1, wherein said calculating updated slave beam nodal velocities at each slave beam node further comprises:

calculating updated solid element nodal velocities by dividing the updated solid element nodal momentums by the respective updated solid element nodal masses; and deriving updated slave beam nodal velocities by accumulating contributions from the respective updated solid element nodal velocities with the corresponding solid element shape functions.

3. The method of claim 1, said obtaining slave beam nodal masses and velocities at each slave beam node from the corresponding master beam nodes further comprises evenly distributing total mass of the corresponding master beam nodes to the slave beam nodes.

* * * * *